Figure 1:
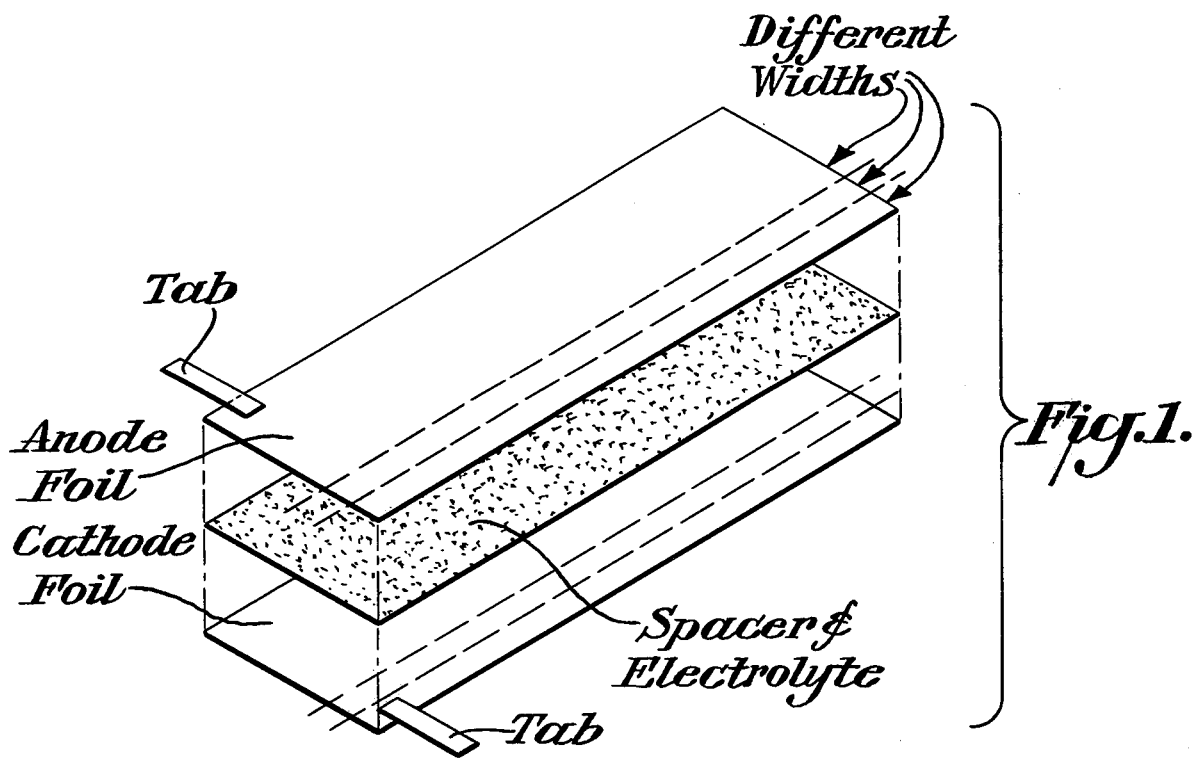

United States Patent [19]

Kolkowski

[11] 4,164,006
[45] Aug. 7, 1979

[54] CAPACITORS WITH MINIMUM ESR

[75] Inventor: James J. Kolkowski, Adams, Mass.

[73] Assignee: Sprague Electric Company, North Adams, Mass.

[21] Appl. No.: 886,189

[22] Filed: Mar. 13, 1978

Related U.S. Application Data

[62] Division of Ser. No. 752,585, Dec. 20, 1976, Pat. No. 4,107,834.

[51] Int. Cl.² .............................................. H01G 9/00
[52] U.S. Cl. .................................................. 361/433
[58] Field of Search .................... 361/433, 434; 29/570

[56] References Cited

U.S. PATENT DOCUMENTS

| | | | |
|---|---|---|---|
| 3,731,354 | 5/1973 | Rayburn | 29/25.42 |
| 3,789,502 | 2/1974 | Callins et al. | 29/570 |

OTHER PUBLICATIONS

Peekema et al., "Factors Affecting the Impedance of Foil-Type Electrolytic Capacitors", *Electrochemical Technology*, May–Jun. 1968, pp. 166–167.

Darbie et al., "Electrical Design Requirements for Electrolytic Capacitors Used in Regulated Low Voltage DC Power Supplies", Electronic Components Conference, May 1973, pp. 99–107.

Sangamo Electric Company, "Preliminary Bulletin on Type 101 Computer Grade Aluminum Electrolytic Capacitor", pp. 1–14.

Puppolo et al., "Stacked Foil Capacitor Packaging Improvements and Technology", Electronics Components Conference, 1975, pp. 110–114.

Geissler, "Electrolytic Capacitor Selection Guide for Low Voltage DC Power Supply Input Filter Applications", Sprague Technical Paper 75-1.

*Primary Examiner*—James W. Davie
*Attorney, Agent, or Firm*—Connolly and Hutz

[57] ABSTRACT

Correlated electrolytic capacitors having a standard diameter in which each capacitor has a constant foil length providing operation at a standard frequency with an equivalent series resistance not appreciably in excess of the lowest ESR for the standard frequency.

2 Claims, 2 Drawing Figures

CAPACITORS WITH MINIMUM ESR

CROSS REFERENCE TO RELATED APPLICATION

This application is a division of application Ser. No. 752,585 filed Dec. 20, 1976, now U.S. Pat. No. 4,107,834 issued Aug. 22, 1978.

BACKGROUND OF THE INVENTION

This invention relates to capacitors with minimum ESR, and more particularly to correlated electrolytic capacitors in a range of capacitances and voltages with minimum ESR.

The dielectric of an aluminum electrolytic capacitor is aluminum oxide that is formed to a predetermined thickness by anodizing a high purity aluminum foil. This oxide on the anode foil is separated from the cathode in the capacitor section by paper spacers that are saturated with a conducting liquid electrolyte. Anode and cathode terminations are brought out from the capacitor section by means of aluminum tabs that are fastened to the foils and to the capacitor terminals.

The equivalent circuit of an electrolytic capacitor has a conductance which is the DC leakage current path, in parallel with a pure capacitance. This combination is in series with an equivalent series resistance (ESR) and an inductance. Capacitance is determined mainly by the surface area of the anode foil and the dielectric thickness. Anode foil is etched to achieve surface area gains as much as 40 times that of an unetched foil. Dielectric oxide thickness is a function of the capacitor's rated voltage. Inductance is determined by the number and position of input and output current paths that are provided to the capacitor. Inductance is influenced by various methods of connecting tabs to terminals, extended foils, and terminal positioning. The ESR of the capacitor is the sum of the resistance due to foil resistivity, oxide, electrolyte and spacer contributions, and method of termination.

It has been the practice in capacitor manufacture to reduce the ESR by increasing the foil length. However, this practice has the shortcoming that there is a limit to the extent to which increase of foil length reduces ESR. Lengthening the foil increases the foil resistance, so that at a critical point this foil resistance can result in an increase in ESR in the capacitor.

In certain capacitors, such as those used in high frequency applications, low series resistance is an important characteristic. Further, it is valuable to provide a capacitor having the minimum ESR accurately designated for use in applications of the capacitor. The application is simplified if the deviation of ESR and capacitance of the capacitor lie within a given and symmetrical tolerance.

Capacitors are used to provide capacitance in electrical circuits through a range of capacitances and at various D-C working voltages. It is established practice to provide groups of capacitors at various working voltages, so that a circuit designer has a selection of voltages and capacitances to choose from. As pointed out above, it is important for the designer to also know the minimum, maximum, and typical ESR of the selected capacitors.

Selection of a capacitor for use in an apparatus cannot disregard the dimensional requirements of the apparatus, so that the correlated units, while providing a range of capacitances, should not then encounter assembly problems.

It is an object of this invention to provide a number of capacitors of a D-C working voltage with a range of capacitances and a standard capacitor body diameter and the minimum ESR for each capacitance in the voltage rating group.

SUMMARY OF THE INVENTION

The present invention provides a correlation of aluminum electrolytic capacitors for high frequency application in a series wherein the units of the group having various capacitances and working voltages all have the same standard diameter dimension and the minimum ESR for the capacitance at the working voltage rating at a standard frequency.

The series of capacitors using the same electrolyte and spacer, the same formation process, the same purity of foil and tabbing and the same percentage of crushing exhibits the same minimal ESR without regard to the foil width or capacitance rating.

With this system, for example, a designer is provided in group of high frequency capacitors, a single case diameter, a choice of capacitors and working voltage ranges, each of minimum ESR which is designated without regard to the foil width or capacitance rating.

The features of this invention are:
The ESR of the capacitor series is the lowest possible for each rating in size;
The ESR is specified so as to give the minimum, maximum and typical ESR of the selected capacitors.

Figure 2:
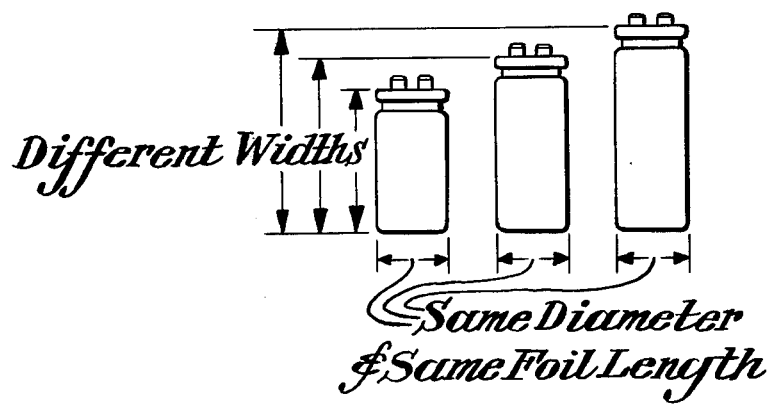

The above invention will be more clearly understood when considered in the light of the following description taken together with the accompanying drawings in which:

FIG. 1 is a perspective of an arrangement of capacitor elements with legends identifying significant features of the structure, and FIG. 2 illustrates the dimensional relationships of the completed capacitors according to this invention.

This invention provides a group of correlated electrolytic capacitors having a constant foil length which gives minimum ESR for various capacitances and working voltages by establishing for a foil assembly of cathode foil, anode foil, electrolyte, spacer and tab contacts, the foil resistance, shunt resistance, resistance of tab contacts, as defined in greater detail below and calculating the constant foil length and the minimum ESR by the formula $$L = \sqrt{\frac{A + B + C}{2[D_A + D_C(1 - Cr)]}}$$

A series of capacitors, according to the present invention, can be produced which supply the designers need for an ability to select capacitance and know the minimum, maximum and typical ESR while having the capacitors available in standard diameter case.

Building capacitors in accordance with the factors in the above formula by the selection of materials and the foil length determines the value of ESR, and keeping this foil length constant from capacitor rating to capacitor rating insures minimal and constant ESR levels.

This is accomplished by measuring the characteristics of the capacitor components and establishing tab and contact resistance of electrical connnection to the foils, the anode and cathode foil resistivity, and the electrolyte-oxide interface, so in the construction of the capacitor bodies they have the common diameters to give the minimum ESR for a capacitance and working voltage at a standard frequency.

Other features and advantages will become more apparent upon consideration of the following description:

The series of capacitors provided by the method of this invention have a foil assembly which is comprised of an anode and cathode aluminum foils, tab attachments making contact with each of the foils and an electrolyte spacer combination between the foils. The anode foil is formed with a dielectric oxide and the foils have a composition in which the foil purity relates to the foil resistance. The other components similarly provide values which establish the characteristics of the foil assembly. Characteristics of this foil assembly relevant to the method of the present invention include the shunt resistance, anode foil resistance, cathode foil resistance and resistance of the tabs and contacts.

These characteristics are represented by the following symbols:

$$ESR = R_S + R_A + R_C + R_{Tab} + \text{Contact}$$

$R_S$ = Shunt resistance (oxide, electrolyte/spacer, interface)
$R_A$ = Anode foil resistance
$R_C$ = Cathode foil resistance
$R_{Tab}$ + Contact = Total resistance of the tabs and the contact resistance between these tabs and the foils and the terminals.

According to this invention these characteristics are established by measurements of these significant foil assembly components. In the following description the derivations of these characteristics from these measurements are described.

The following is the derivation and determination of shunt resistance, $R_S$.

$R_S$ is the sum of A, B, and C, divided by 2 times the anode foil area:

$$R_S = \frac{A + B + C}{2 LW}$$

In the formula
A = Electrolyte/spacer combination $$A = \frac{\rho T}{P}$$

where,
$\rho$ = Electrolyte resistivity
T = Nominal spacer thickness
P = Paper electrical porosity of the spacer, or $$= \frac{100R}{R + \Delta R}$$

where
R is the electrolyte resistance and $\Delta R$ is the resistance of the spacer
B = The interface or "double-layer" resistance of the electrolyte/oxide barrier, and the electrolyte/frequency-dependent porous oxide $$B = \sqrt{\rho} \left( .049 + \frac{\sqrt{\tau}}{f} \right)$$

where,
$\rho$ = Electrolyte resistivity
$\tau$ = Conductive salt concentration in formation electrolyte
f = Frequency
C = Oxide Contribution to ESR $$C = \frac{100KV}{fE}$$

V = Formation volts
f = Frequency
E = Etch ratio; the cap/in² for etched foil divided by the cap/in² for plain foil, for a given formation voltage
K = Known standard efficiency constant; varies between 0.9 and 1.3 (depending on the formation voltage) to correct for differences in uniformity between low voltage and high voltage oxides and compensate for the cathodic oxide contribution to ESR within the capacitor The following is the derivation and determination of $R_A$:

$R_A$ is the anode foil resistance and a function of the resistivity of 99.99% pure foil ($1.1 \times 10^{-6}$ ohm-in), its physical dimensions, and the number and placement of tabs:

$$R_A = \frac{1.1 \times 10^{-6} \times L}{8 N_A^2 W T_A}$$

L = Anode length
$N_A$ = Tabbing (see Tabbing Table below)
W = Anode width
$T_A$ = Anode thickness after etching
If we set $$D_A = \frac{1.1 \times 10^{-6}}{8 N_A^2 T_A}$$

then $$R_A = D_A \times \frac{L}{W}$$

| Tabbing Table; effect of the positioning | |
|---|---|
| Tab location | N |
| At End | 0.5 |
| In Center | 1 |
| Dual Tabs at ¼ and ¾ points | 2 |

The following is the derivation and determination of $R_C$: $R_C$ is the cathode resistance and is similar to $R_A$:

$$R_C = \frac{1.17 \times 10^{-6} [(1 - Cr)L + CrW]}{8 N_C^2 W T_C}$$

$1.17 \times 10^{-6}$ = Resistivity of 99.45% pure foil in ohm-in $$C_r = \frac{\text{Percent crush}}{100}$$

where percent crush is the extent of the mashing together of the extended edges of the cathode foil
If we set $$D_C = \frac{1.17 \times 10^{-6}}{8 N_C^2 T_C}$$

then $$R_C = D_C \times \frac{(1 - C_r)L + C_r W}{W}$$

Determination of crush percent, $C_r$:

At 100% $\frac{(1 - C_r)L + C_r W}{W} =$ $$\frac{(1 - 1)L + 1W}{W} = \frac{W}{W} = 1$$

At 0% $\frac{(1 - C_r)L + C_r W}{W} =$ $$\frac{(1 - 0)L + 0W}{W} = \frac{L}{W}$$

Therefore, the larger the (L/W) ratio, the greater the crushing effect on ESR.

A 90% crush figure appears typical and should be used for ESR calculation.

e.g.: (L/W)=100 (can be much greater in large capacitors)

Cathode $D_C$=0.00039 (2-mil, single tab)

At 100% crush, the cathode contribution is 0.39 milliohms. At 0% crush, it is 39 milliohms. Each 10% variation in crushing, say 90% to 80%, adds about 4 milliohms to the ESR.

With information determined as above the correlation according to this invention may be determined by the procedures indicated below. Reference is first made to determinations by the following formulae:

$$ESR = R_S + R_A + R_C + R_T + C$$

$$ESR = \frac{A + B + C}{2LW} + D_A \frac{L}{W} + D_C \frac{(1 - C_r) L + C_r W}{W} + R_T + C$$

To determine how ESR varies with respect to length, this equation is differentiated with respect to length (L).

$$\frac{d\,ESR}{dL} = -\frac{(A + B + C)}{2 L^2 W} + D_A \frac{1}{W} + D_C \frac{(1 - C_r)}{W}$$

It has been found that the foil length for the absolute minimum ESR can be determined. The differential is set to zero, and the equation is solved for L $$0 = -\frac{(A + B + C)}{2 L^2 W} + D_A \frac{1}{W} + D_C \frac{(1 - C_r)}{W}$$

$$0 = -\frac{(A + B + C)}{2 L^2 W} + \frac{D_A + D_C(1 - C_r)}{W}$$

$$L^2 = \left(\frac{A + B + C}{2 W}\right)\left(\frac{W}{D_A + D_C(1 - C_r)}\right)$$

$$L = \sqrt{\frac{A + B + C}{2(D_A + D_C(1 - C_r))}}$$

With C inversely proportional to frequency, at 20 KHZ or similar high frequencies, C is negligible, and the critical length is $$L = \sqrt{\frac{A + B}{2(D_A + D_C(1 - C_r)}}$$

Then, for this series of capacitors, with a common electrolyte/spacer (A), formation process (B), foil purities and tabbing ($D_A$ and $D_C$) and crushing ($C_r$), the ESR will be at a minimum regardless of the foil width or capacitance rating, and is reproducible from capacitor to capacitor, because the foil length is held constant.

That is, the selection of materials and the foil length determines the value of ESR, and keeping this foil length constant from capacitor to capacitor insures minimal and consistent ESR levels.

For example with a capacitor body rated at 5-volts working voltage and fitting into a 1.375" diameter case the correlation of capacitance, maximum RMS ripple current and minimum ESR are set forth in the following table:

Table I

| μF | Max. RMS Ripple Current (Amperes) at 20KHZ and 85° C. | ESR ± 30% (Ohms) at 20KHZ | Can Height (Inches) |
|---|---|---|---|
| VOLTS D-C WORKING | | | |
| 18000 | 7.6 | .0054 | 2¼ |
| 25000 | 9.5 | .0047 | 2⅝ |
| 32000 | 11.3 | .0041 | 3⅛ |
| 39000 | 13.1 | .0036 | 3⅝ |
| 46000 | 14.6 | .0030 | 4⅛ |
| 53000 | 16.6 | .0029 | 4⅝ |
| 60000 | 18.4 | .0028 | 5¼ |
| 67000 | 19.5 | .0027 | 5⅝ |

The foil length is the same for all the capacitors. Thus knowing the foil length to fit a group of capacitor bodies of a given structure into a standard case size, the required foil width for each capacitance rating can be readily determined to produce a set of capacitors having a known minimum ESR.

From the foregoing description it will be appreciated that capacitors are furnished in a range of capacitances at standard voltage ratings with known minimum ESR in a standard diameter case. Also there is described a method of manufacturing a set of capacitors wherein each capacitor from first to last in the series is provided with a diameter suitable for a single case size.

I claim:

1. A plurality of electrolytic capacitors of a voltage rating and having a minimum ESR at a standard frequency and for the rating and the capacitor capacitance,
    each capacitor comprising an anode foil, a cathode foil, a spacer positioned between said foils, an electrolyte in contact with said foils and tab electrical connections to the foils,
    the foils, electrolyte, spacer and tabs being assembled into capacitor bodies and encased in an enclosure, the foils, spacer, tabs and electrolyte of each capacitor body being so constructed and arranged that the respective capacitance of each capacitor is related to a respective foil width and each capacitor having capacitance in accordance with the foil width, and the foil length for said plurality of capacitors is constant, whereby a correlated plurality of capacitors are formed in which plurality there are at least two capacitors having different capacitances, and being of a uniform voltage rating, all of which plurality of capacitors are related to each other in having a constant foil length and a minimum ESR at said standard frequency so that each capacitor is capable of operation at said standard frequency at an ESR which is not appreciably in excess of its lowest ESR at said standard frequency.

2. A plurality of electrolytic capacitors as claimed in claim 1 wherein the anode and cathode foils are of aluminum.

* * * * *